United States Patent [19]
Campi et al.

[11] Patent Number: 5,559,323
[45] Date of Patent: Sep. 24, 1996

[54] OPTICAL PROCESSING DEVICE FOR LIGHT RADIATIONS

[75] Inventors: Domenico Campi; Heinz-Christoph Neitzert, both of Turin, Italy

[73] Assignee: CSELT - Centro Studi e Laboratori Telecomunicazioni S.p.A., Romoli, Italy

[21] Appl. No.: 401,564

[22] Filed: Mar. 9, 1995

[30] Foreign Application Priority Data

Mar. 22, 1994 [IT] Italy ................................. 94A000204

[51] Int. Cl.⁶ .............................. G02B 6/10; H01J 40/14
[52] U.S. Cl. ........................... 250/214.1; 250/214 LA; 385/2; 385/8; 359/237
[58] Field of Search ............................ 359/237, 238; 250/214 LA, 214.1, 214 LS; 385/1, 2, 5, 8

[56] References Cited

U.S. PATENT DOCUMENTS

| | | | |
|---|---|---|---|
| 4,514,624 | 4/1985 | Edwards et al. ............... | 250/214.1 |
| 4,957,337 | 9/1990 | Ogawa et al. .................. | 359/237 |
| 5,113,283 | 5/1992 | Sugawara ....................... | 385/2 |
| 5,149,957 | 9/1992 | Pierce et al. .................. | 250/214.1 |
| 5,339,370 | 8/1994 | Sano et al. ..................... | 385/2 |
| 5,402,259 | 3/1995 | Lembo et al. ................... | 385/2 |
| 5,451,767 | 9/1995 | Amano et al. ................... | 250/214.1 |

*Primary Examiner*—Stephone Allen
*Attorney, Agent, or Firm*—Herbert Dubno

[57] ABSTRACT

An optical processing device for light radiation provides non-linear transfer functions in an optical guide. A coupled quantum well modulator is reverse biased by an adjustable dc voltage source through an impedance and light radiation to be processed is sent in parallel with the layers composing the modulator guiding zone. The coupled quantum well modulator has a multiplicity of layers including some which form a guide zone comprised of a sequence of alternating quantum wells and barrier layers. The light radiation to be processed passes parallel to the layers through this guiding zone.

1 Claim, 2 Drawing Sheets

OPTICAL PROCESSING DEVICE FOR LIGHT RADIATIONS

FIELD OF THE INVENTION

The present invention relates to telecommunications-applied optoelectronics using light radiation as an information carrier and, more particularly, to an optical processing device for light radiations.

BACKGROUND OF THE INVENTION

As is well known, optical signal processing is important to the development of optical fiber telecommunications systems, since it allows realizing complex functions that are currently obtained with electronic systems. For this purpose, devices that are capable of performing different transfer functions between input and output optical signals are required.

Non-linear transfer functions are particularly interesting and are more difficult to achieve. These transfer functions to the functions in the electronics field, allow devices to be made to treat optical signals, like threshold comparators, amplitude limiters, pulse shapers, oscillators, memories. Combinational and sequential logic functions, such as NAND, NOR, flip-flop, etc., are equally interesting for such devices.

It is also very useful to realize these functions in devices that act as optical waveguides for transmitted signals, since it is technologically much easier to send to, or to get from, these devices the radiation coming from another guiding system, like optical fibers. Moreover, optical waveguides are particularly well suited to be arranged on a common plane with lasers, optical amplifiers, electro-optical modulators, etc., to be integrated into the same substrate.

Non-linear transfer functions can be accomplished by a device called SEED (Self Electrooptic Effect Device), composed of an electro-optical modulator negatively fed back through an electronic circuit. Should this feedback be positive, such device shows a characteristic of the light absorption as a function of the inverted voltage applied, at constant wavelength, with an interval where absorption decreases upon voltage increase. This condition causes the photocurrent crossing the device to affect the device capacity to absorb light, that in turn affects the photocurrent. This results in an optical bistability that allows obtaining non-linear transfer functions.

Such a device is described in the article entitled "The quantum well self-electrooptic effect device: optoelectronic bistability and oscillation, and self-linearized modulation" by D. A. B. Miller et al., IEEE Journal of quantum electronics, Vol. 21, September 85, pages 1462–1476. The electro-optical modulator used is a PIN diode, where the active part is a heterostructure containing a sequence of uncoupled quantum wells. The system does not have waveguide geometry, nor can it be modified to operate in a waveguide geometry due to its low transmittivity to optical signals. To solve this, it would be necessary to provide extremely short guides (20 µm), and this is a very difficult technological problem.

OBJECT OF THE INVENTION

It is an object of the invention to provide an optical processing device for light radiation which allows realizing the above-mentioned functions in an optical waveguide, enabling the fabrication of integrated optical circuits suitable to perform particularly complex logic and processing functions and facilitating optical fiber coupling.

SUMMARY OF THE INVENTION

This object and others are attained in accordance with the present invention in an optical processing device for light radiation, wherein an electro-optical modulator is reverse biased by an adjustable dc voltage source through an impedance in order to show a non-linear transfer function. According to the invention, the electro-optical modulator is a coupled quantum well modulator, including a guiding zone comprising a sequence of alternating quantum wells and barrier layers, wherein light radiation to be processed is sent in parallel with the layers.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
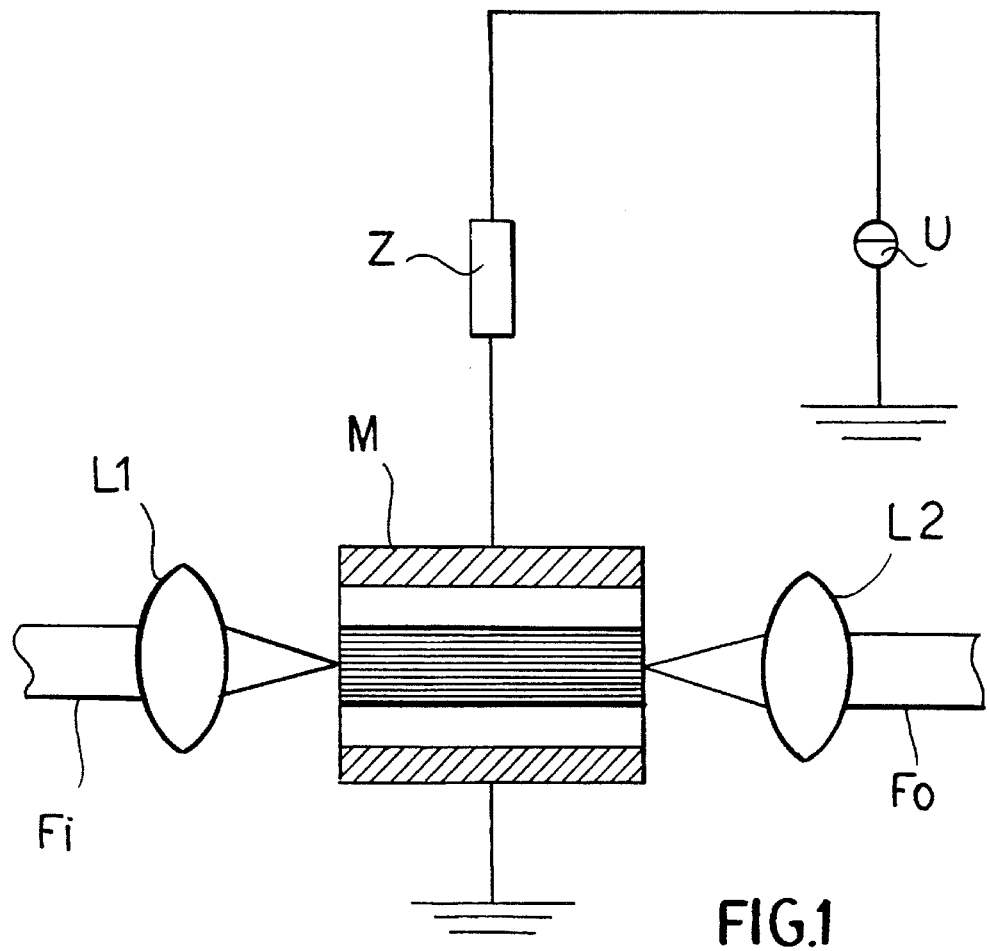
FIG. 1 is a functional diagram of the optical processing device for light radiation according to the invention.

In FIG. 1, a coupled quantum well modulator M is reverse biased by an adjustable de voltage source U through a load impedance Z. An optical beam Fi, sent towards the device, is injected into the guiding zone by a suitable optical focusing system L1, and an optical beam Fo, collimated by an optical system L2, is taken therefrom.

The load impedance Z, in addition to setting the operating point of the modulator M, electrically equivalent to a PIN diode, also introduces a positive reaction. In fact, at the operating wavelength, the optical radiation absorption coefficient decreases, and therefore the photocurrent crossing the modulator decreases upon increase of the reverse applied voltage. The photocurrent decrease induces a voltage drop reduction on the load impedance and consequently it causes a further increase of the reverse applied voltage.

The desired transfer function Po/Pi (optical output power)/(optical input power) can be chosen among those which are possible by ones changing the voltage supplied by the adjustable generator U and the load impedance Z value. The two parameters can be changed both simultaneously, or one at a time.

Figure 2:
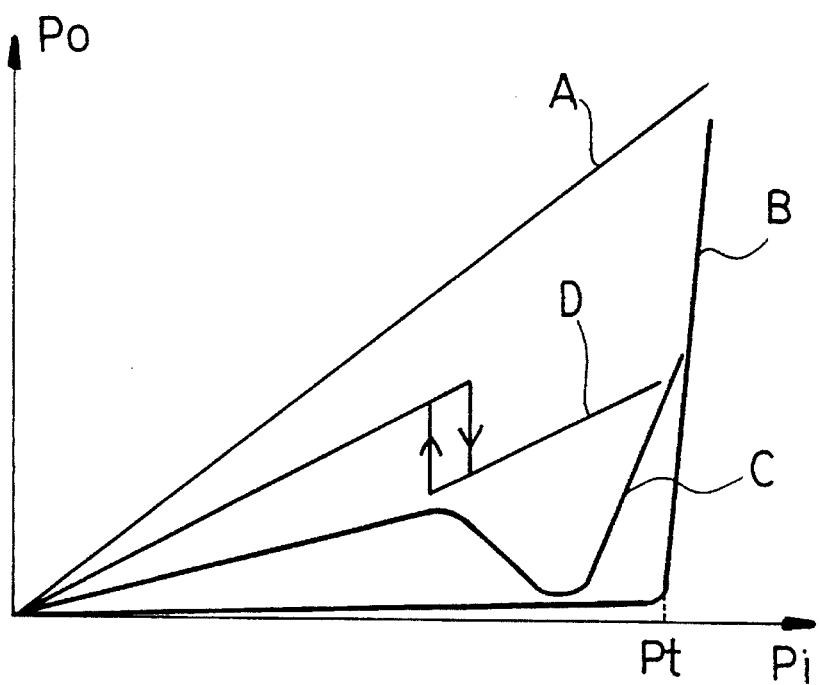
FIG. 2 is a Cartesian diagram on which several transfer functions are represented.

FIG. 2 shows four transfer functions, obtained using as load impedance a resistance whose value is 1MΩ.

The curve A shows a linear behavior, obtained with a biasing voltage equal to 0 V.

The curve B shows the behavior of an optical comparator, obtained with a biasing voltage equal to −50 V, with threshold power Pt.

Figure 3:
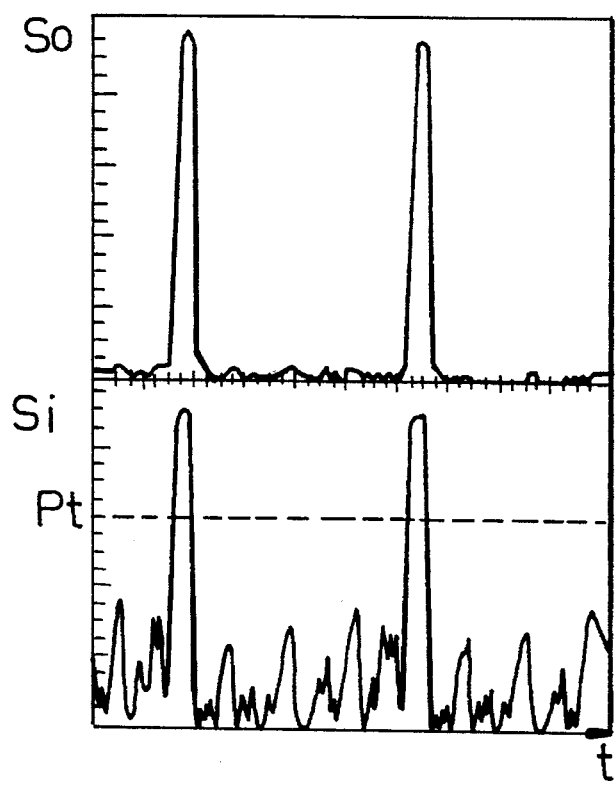
FIG. 3 is a time diagram showing optical signal processing.

An example of optical processing of an input signal Si, carried out using this transfer function, is shown by the time diagram in FIG. 3, where the ordinates represent power levels in arbitrary units.

The signals below the intensity threshold Pt are suppressed in the output signal So, thereby increasing the signal/noise ratio of the optical binary signal.

By changing voltage only, several functions can be realized. For example, using a mere inductive reactance as load impedance Z and a biasing voltage equal to −35 V, an optical oscillator can be obtained. In this case, by sending to the input a continuous optical signal, an optical signal is obtained at the output whose amplitude is oscillates at the frequency set by the resonating electric circuit, composed of the inductance Z and of the capacity of the coupled quantum well modulator M. The transfer function obtained is the one referred to as C in FIG. 2.

Thanks to the non-monotonic behavior of the transfer function C, a frequency multiplier can also be realized. By sending to the input an optical signal with amplitude oscillating in the non-monotonic part of the transfer function, for example in the section including a positively sloped part, a negatively sloped part and again a positively sloped part, a signal oscillating at twice the input signal frequency is obtained at the output.

It is also possible to exploit the transfer function with the behavior referred to as D in FIG. 2, obtained with a biasing voltage of −20 V. This function shows an hysteresis area, that is an area where the output power gets different values depending on whether the input power is increasing or decreasing. In this case, the intensity of the signal transmitted by the device not only depends on the incoming signal intensity, but also on its previous history. Therefore, there is a memory function that can be used to realize a sequential logic device.

Figure 4:
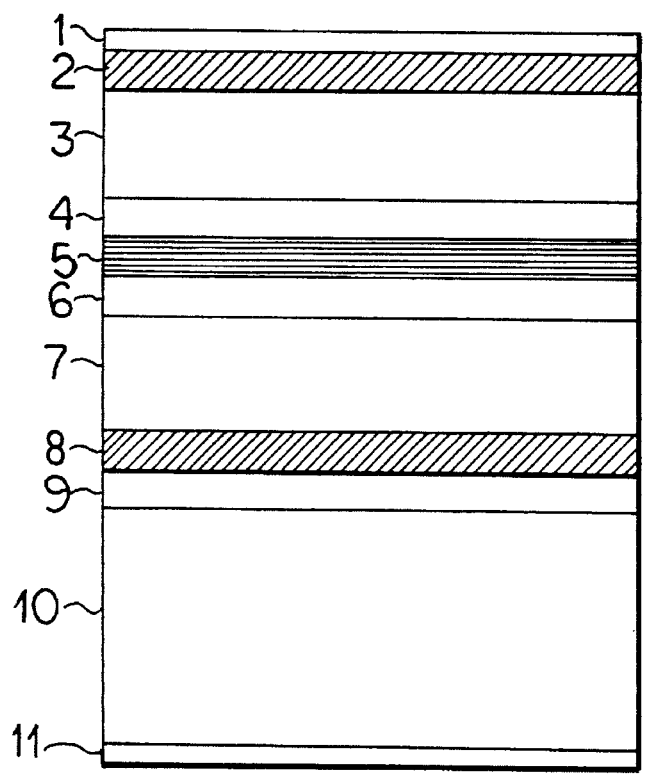
FIG. 4 is a cross-sectional view of the structure of a coupled quantum well modulator.

A coupled quantum well modulator for the above-described device, can have a structure similar to the one shown in FIG. 4. Modulator performance is obtained by a structure with a conventional sequence of layers, but using adequately defined thicknesses of the thin layers realizing the quantum wells and of the barrier layer, so that the quantum wells are coupled from the quantum-mechanical point of view.

The coupled quantum well modulator structure is particularly suitable to operate on a light radiation sent parallel to the layers.

Thicknesses of the individual layers shown in the figure are not scaled.

Reference 1 shows a metal layer adapted to allow the structure to be connected to a rheophore to apply biasing voltage.

Reference 2 shows a p-type InGaAs layer, whose thickness is about 0.1 μm, that operates as contact layer.

Reference 3 shows a p-type InP layer whose thickness is about 2 μm.

References 4 and 6 show two intrinsic layers, also made of InP and with a thickness of 0.1 μm.

Reference 5 shows a sequence of quantum wells and barriers, respectively made of InGaAs and InP, composed of a number of quantum wells from 2 to 100. Light transmitted through the device is confined in this sequence of layers.

Reference 7 shows a n-type InP layer whose thickness is about 2 μm.

Reference 8 shows a n-type InGaAs layer whose thickness is about 0.1 μm and whose function is absorbing light which may escape from the guiding layers.

Reference 9 shows a n-type InP layer whose thickness is about 0.1 μ, that covers the commercial substrate, that is usually imperfect.

Reference 10 shows the n-type InP substrate.

Finally, reference 11 shows a metal layer adapted to allow the structure to be connected to a second rheophore to apply the biasing voltage.

As can be noted, the structure is of the PIN type (p-doped layer, intrinsic layer and n-doped layer) and in order to operate it requires a reverse biasing voltage suitable to generate an electric field around $10^4$ V/cm.

Variations and modifications are possible without departing from the scope of the claims. For example, optical systems L1 and L2 can be absent and light radiation can be focused by optical fibers with focusing end faces. Load impedance Z can also be realized with active components, such as transistors, an FET, operational amplifiers.

We claim:

1. An optical processor for light radiation comprising:
   a coupled quantum well modulator having a multiplicity of parallel layers with at least some of said layers forming a guiding zone comprised of a sequence of alternating quantum wells and barrier layers;

means at one side of said coupled quantum well modulator for launching into said guiding zone light radiation to be processed, said light radiation to be processed passing parallel to said layers through said guiding zone;

means at an opposite side of said coupled quantum well modulator for deriving light radiation processed in said coupled quantum well modulator; and an adjustable dc source in series with an impedance connected across said multiplicity of parallel layers and selected to establish for given values of the dc source and said impedance a respective nonlinear transfer function for processing said light radiation as said light radiation passes through said guiding zone, said impedance having a voltage drop due to a photocurrent in said coupled quantum well modulator creating a feedback acting upon light absorption characteristics of the coupled quantum well modulator.

\* \* \* \* \*